US008615712B2

(12) United States Patent
Porter et al.

(10) Patent No.: US 8,615,712 B2
(45) Date of Patent: Dec. 24, 2013

(54) EXECUTING A POPULATED CODE TEMPLATE TO GENERATE A BROWSER-EXECUTABLE SOFTWARE PROGRAM TO PRESENT A WEB PAGE AS A MOBILE APPLICATION

(75) Inventors: Robert Gerald Porter, Dundas (CA); Andrew John Holden, Hamilton (CA)

(73) Assignee: Weever Apps Inc. (CA)

( * ) Notice: Subject to any disclaimer, the term of this patent is extended or adjusted under 35 U.S.C. 154(b) by 0 days.

(21) Appl. No.: 13/407,745

(22) Filed: Feb. 28, 2012

(65) Prior Publication Data

US 2012/0226970 A1 Sep. 6, 2012

Related U.S. Application Data

(60) Provisional application No. 61/448,139, filed on Mar. 1, 2011.

(51) Int. Cl.
*G06F 3/00* (2006.01)

(52) U.S. Cl.
USPC .............................. 715/744; 715/762; 717/106

(58) Field of Classification Search
None
See application file for complete search history.

(56) References Cited

U.S. PATENT DOCUMENTS

| 7,650,432 B2 | 1/2010 | Bosworth et al. |
| 2006/0053368 A1 | 3/2006 | Bosworth et al. |
| 2007/0066364 A1 | 3/2007 | Gil et al. |
| 2009/0007054 A1* | 1/2009 | Voss .............................. 717/101 |
| 2009/0064047 A1 | 3/2009 | Shim et al. |
| 2009/0172560 A1 | 7/2009 | Cole et al. |
| 2009/0210631 A1 | 8/2009 | Bosworth et al. |
| 2009/0260022 A1* | 10/2009 | Louch et al. .................. 719/328 |
| 2009/0325565 A1 | 12/2009 | Backholm |

(Continued)

FOREIGN PATENT DOCUMENTS

| CA | 2516906 | 2/2006 |
| CA | 2490559 | 6/2006 |
| CA | 2623442 | 4/2007 |
| CA | 2656338 | 8/2009 |

OTHER PUBLICATIONS

Magmito About Our Vision; http://www.magmito.com/about_magmito.php; last accessed on Aug. 20, 2012.

(Continued)

*Primary Examiner* — Stephen Hong
*Assistant Examiner* — Asher Kells
(74) *Attorney, Agent, or Firm* — Steven M. Greenberg, Esq.; Carey, Rodriguez Greenberg O'Keefe, LLP

(57) ABSTRACT

A browser-executable software program for presenting a web page that provides the "look and feel" and functionality of a mobile application can be automatically generated from a mobile application specification. The mobile application specification identifies one or more predetermined content component types and one or more associated content sources. For each content component type, a copy of a corresponding code generation template is populated with a URL for each corresponding content source and executed to produce browser-executable program code. The browser-executable program code is then embedded into a populated copy of a navigation container code template to form a complete browser-executable software program, which is integrated into an HTML page. The HTML page can be returned in response to a request from a browser executing on a networked mobile wireless telecommunication computing device and the HTML page carries the browser-executable software program to the browser.

21 Claims, 9 Drawing Sheets

(56) References Cited

U.S. PATENT DOCUMENTS

2010/0217838 A1    8/2010    Wormald
2010/0228720 A1    9/2010    Wormald et al.
2011/0289394 A1    11/2011    Roh et al.
2012/0030592 A1*    2/2012    Cui et al. ............... 715/763

OTHER PUBLICATIONS

Magmito About Our Vision; http://www.magmito.com/learnmore.php; last accessed on Aug. 20, 2012.

Dudamobile Make Your Website Mobile; http://www.dudamobile.com/index.php; last accessed on Aug. 20, 2012.

Dudamobile Features; http://www.dudamobile.com/features.html; last accessed on Aug. 20, 2012.

Mobile By Conduit; http://mobile.conduit.com/; last accessed on Aug. 20, 2012.

Mobile By Conduit; http://mobile.conduit.com/How-to-Create-Mobile-Apps.aspx; last accessed on Aug. 20, 2012.

\* cited by examiner

EXECUTING A POPULATED CODE TEMPLATE TO GENERATE A BROWSER-EXECUTABLE SOFTWARE PROGRAM TO PRESENT A WEB PAGE AS A MOBILE APPLICATION

CROSS-REFERENCE TO RELATED APPLICATION

This application claims priority to U.S. Provisional Application No. 61,448,139 filed on Mar. 1, 2011, the teachings of which are hereby incorporated by reference.

TECHNICAL FIELD

The present disclosure relates to browser-executable software programs for networked mobile wireless telecommunication computing devices, and more particularly to the use of such browser-executable software programs to present a web page as a mobile application.

BACKGROUND

Networked mobile wireless telecommunication computing devices such as smartphones and tablet computers have recently come into widespread use, and as a result there has been an increasing focus on providing mobile applications or "apps", that is, software programs that are tailored to these networked mobile wireless telecommunication computing devices, rather than to laptop or desktop computers. Mobile applications run directly on the operating system of the networked mobile wireless telecommunication computing device. As a result, developing mobile applications requires a knowledge of the relevant operating system, such as iOS for iPhone and iPad devices offered by Apple Inc. and Android offered by Google Inc., and entails a fairly involved process since each mobile application must be developed more or less from scratch.

Many networked mobile wireless telecommunication computing devices, especially those sold to consumers, include a Web browser as part of the basic original equipment manufacturer (OEM) software package. A Web browser (referred to herein simply as a "browser") is a software program that can retrieve and present information on the World Wide Web (referred to herein as the "Web") and typically can also run specialized programs written in a suitable scripting language. Such programs are referred to herein as "browser-executable software programs". Because of the ubiquity of browsers as part of the OEM software provided with networked mobile wireless telecommunication computing devices, there has recently been some movement towards the use of browser-executable software programs to mimic a mobile application. Browser-executable software programs that mimic mobile applications are designed to cause the browser to present a web page that appears to the user to be a mobile application, and can import and present content from specific locations on the Web. For example, content from an entity's existing web site and/or content hosted at a third party web site like Facebook or Flickr, may be presented by such a browser-executable software program. Developing such browser-executable software programs is less involved than developing true mobile applications, i.e. mobile applications that run directly on the relevant operating system. However, development of browser-executable software programs nonetheless requires knowledge of the relevant programming language and browser and knowledge of the presentation format of any content that is to be obtained from the Web, and also requires that the relevant computer program code be manually developed, based on that knowledge, for each browser-executable software program. Thus, while a browser-executable software program that presents a web page as a mobile application is easier and faster to develop than a true mobile application, development of such browser-executable software programs still requires considerable time and effort by a skilled programmer or team of programmers.

SUMMARY

The development of browser-executable software programs to present a web page that appears to the user to be a mobile application is effectively automated. An entity wishing to create such a browser-executable software program need only provide basic specifications that identify the type and source of existing Web-based content to be used and the complete browser-executable software program can be automatically generated, stored, and transmitted to end users in response to a request.

A computer-implemented method for generating a browser-executable software program to present a web page as a mobile application comprises receiving a mobile application specification for a mobile application and automatically generating a browser-executable software program based on the mobile application specification. The browser-executable software program includes a mobile application interface façade for presentation as a user interface to the browser-executable software program.

In an exemplary embodiment, the mobile application specification comprises at least one content component type identifier and at least one content source identifier, with each content source identifier being associated with a content component type identifier. In this embodiment, automatically generating the browser-executable software program based on the mobile application specification comprises the following steps. For each content component type identifier, a code generation template copy of a corresponding code generation template is retrieved from a library of predefined code generation templates. For each content source identifier, a URL for the content source identified by that content source identifier is determined from that content source identifier, and the determined URL is inserted into the code generation template copy for the content component type identifier with which that content source identifier is associated to create a populated code generation template copy. The browser-executable program code is then generated from each populated code generation template copy.

Automatically generating the browser-executable software program based on the mobile application specification may further comprise embedding the browser-executable program code into a copy of a populated navigation container code template. In a preferred embodiment, the browser-executable program code is JavaScript.

In an exemplary embodiment, each content component type identifier is either a content organization type identifier or a content presentation type identifier. Preferably, each code generation template corresponding to a content organization type identifier comprises a communication portion for generating browser-executable program code for transmitting content requests and receiving content in response to a request, a storage portion for generating browser-executable program code for storing the content received in response to a content request, a controller portion for generating browser-executable program code for receiving user input and determining a view according to the user input, and a presentation portion for generating browser-executable program code for presenting the content within the mobile application interface façade. In such an embodiment, inserting the determined URL into the code generation template copy preferably comprises inserting the determined URL into a communication portion copy of the code generation template copy.

The computer-implemented method for generating a browser-executable software program to present a web page as a mobile application may further comprise storing the browser-executable software program, receiving, from a remote mobile wireless telecommunication computing device, a request designating the browser-executable software program, and, responsive to the application request, transmitting the browser-executable software program to the networked mobile wireless telecommunication computing device.

Computer systems and computer program products for implementing the above method are also disclosed.

BRIEF DESCRIPTION OF THE DRAWINGS

These and other features will become more apparent from the following description in which reference is made to the appended drawings wherein.

DETAILED DESCRIPTION

Figure 1:
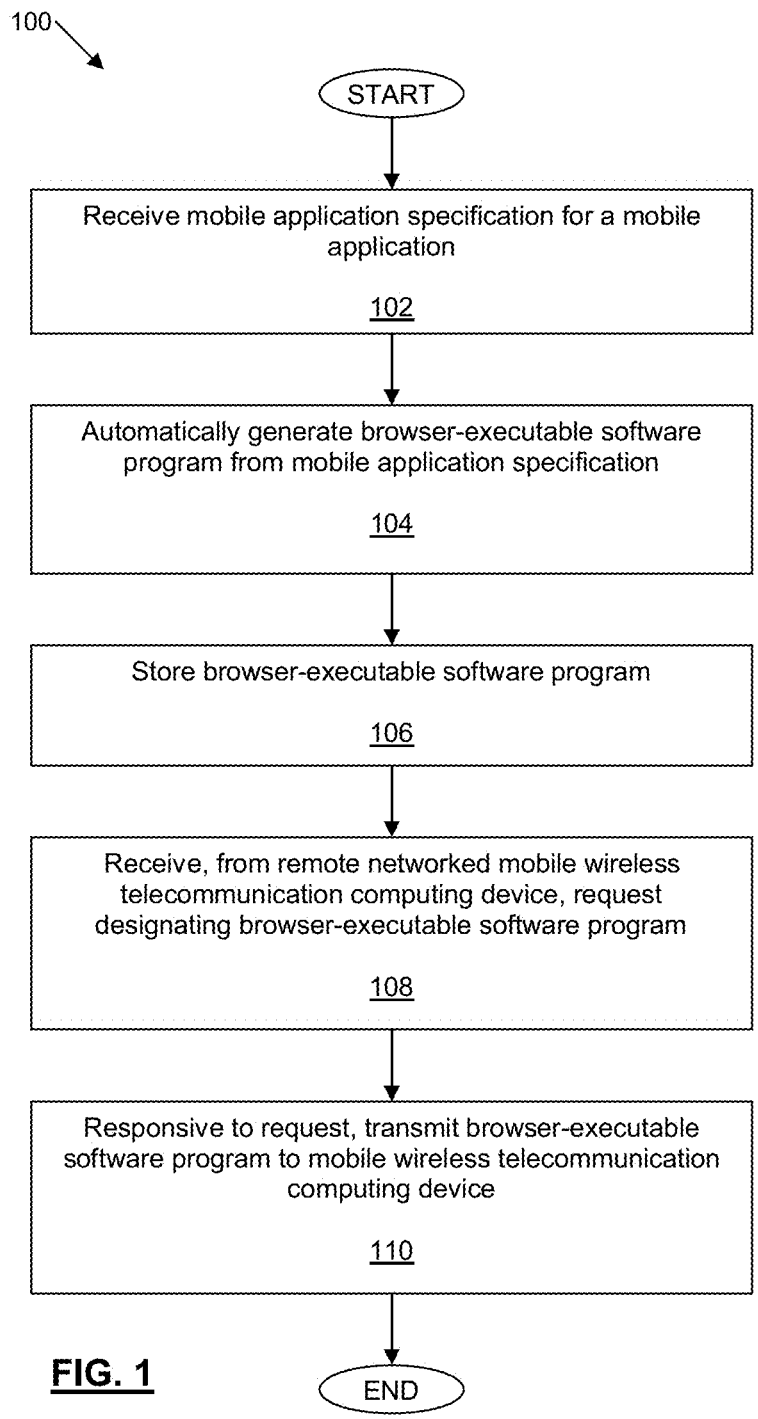
FIG. 1 is a flow chart illustrating an exemplary method for generating a browser-executable software program for presenting a web page as a mobile application.

Referring first to FIG. 1, a flow chart illustrating an exemplary method for generating a browser-executable software program to present a web page as a mobile application is indicted generally at 100. At step 102, the method 100 receives a mobile application specification for a mobile application, and at step 104 the method 100 automatically generates a browser-executable software program from the mobile application specification. At step 106, the method 100 stores the browser-executable software program. At step 108, the method 100 receives, from a remote networked mobile wireless telecommunication computing device, a request designating the browser-executable software program, and at step 110, responsive to the request received at step 108, the method 100 transmits the browser-executable software program to the mobile wireless telecommunication computing device. The browser-executable software program resulting from step 104 includes a mobile application interface façade, and presents the mobile application interface façade as the user interface to the browser-executable software program. A number of conventions have developed for the appearance and interaction features of mobile applications, and the mobile application interface façade preferably follows one of these conventions.

Figure 2:
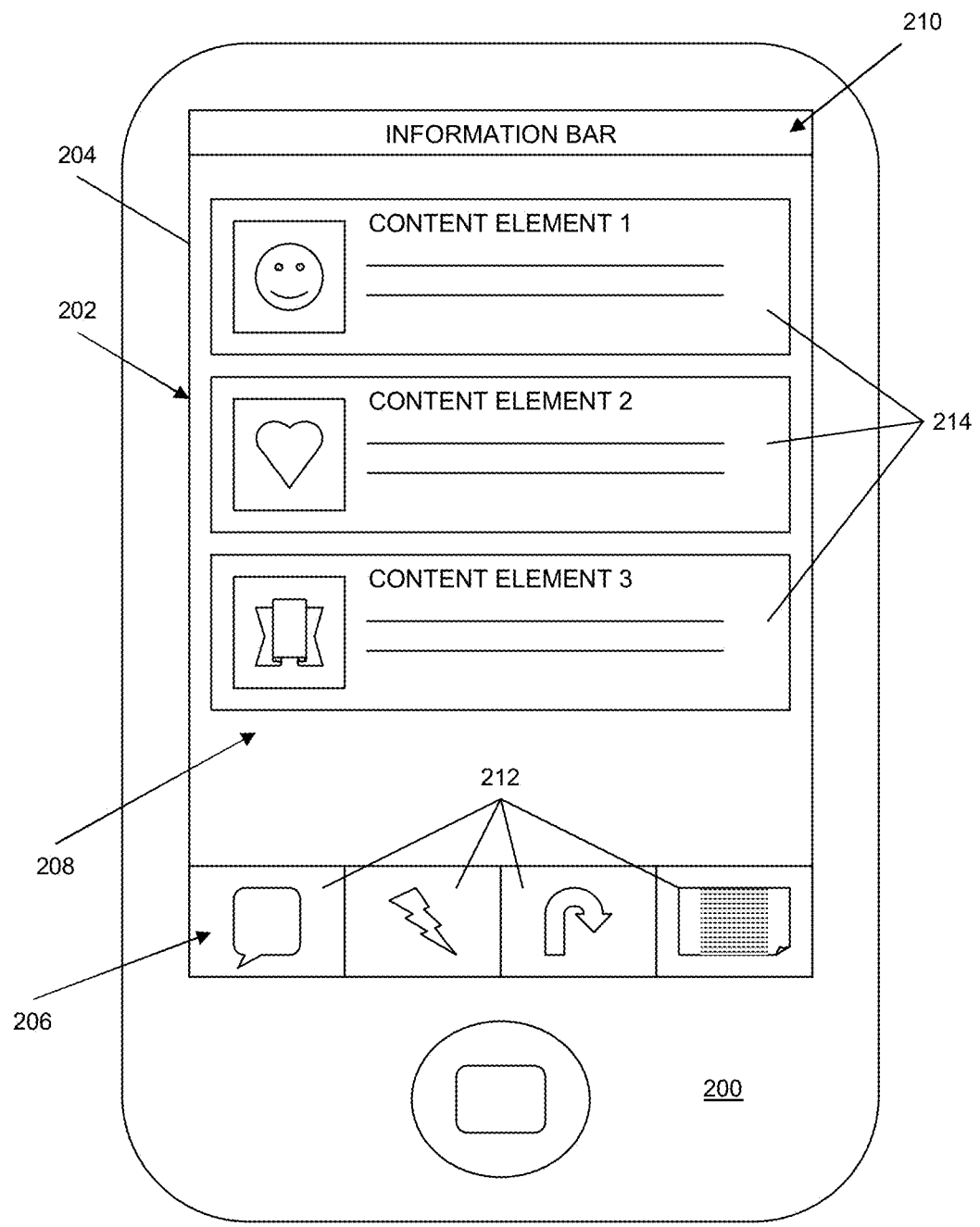
FIG. 2 shows an exemplary networked mobile wireless telecommunication computing device in the form of a smartphone running an exemplary generic mobile application which presents a user interface on a screen of the smartphone.

FIG. 2 shows an exemplary networked mobile wireless telecommunication computing device in the form of a smartphone 200 running an exemplary generic mobile application which presents a user interface 202 on a screen 204 of the smartphone 200. The user interface 202 typifies a commonly used convention for the appearance and interaction features of mobile applications and comprises a navigation region 206, a content display region 208 and an information bar 210, each occupying a fixed screen position for a given display mode of the mobile application. The navigation region 206 comprises a bar extending along the bottom of the screen 204, the information bar 210 extends along the top of the screen 204 and the content display region 208 comprises the remainder of the screen 204 between the navigation region 206 and the information bar 210. The information bar 210 typically presents textual information such as the name of the application. A plurality of navigation icons 212 appear within the navigation region 206, with each navigation icon 212 indicating a content type. Examples of content types may include, for example, a main or "home" screen, Weblogs or "blogs", photos, videos, online ordering, contact information, maps, event calendars, geographic information such as the nearest physical retail location, as well as content imported from external sources, such as social media content that is mediated by an external service provider, such as one or more portions of a "Facebook" page or various "Twitter" feeds. The navigation icons 212 typically indicate the relevant content type symbolically, although textual indications may also be used, either alone or in combination with a symbolic indicator. For example, an image of a chirping bird may be used to indicate social media content generally, or a stylized "t" to may be used to symbolically represent "Twitter" content or a stylized "F" may be used to symbolically represent "Facebook" content. The content display region 208 will display one or more content elements 214.

Activating one of the navigation icons 212, such as by touching it in the case of touchscreen device or selecting it with a curser or pointer, will cause the content display region 208 of the user interface 202 to display one or more content elements 214 of the content type indicated by that navigation icon 212. Thus, activating a navigation icon 212 indicating "photos" may cause the content display region 208 to present a series of thumbnail images that can be selected to enlarge a corresponding image, and activating a navigation icon 212 indicating "Twitter" may cause the content display region 208 to present content relating to one or more "Twitter" feeds. Activating one of the content elements 214 can, for example, cause the content display region 208 of the user interface 202 to display a full-screen version of the activated content element 214.

In some cases, there may be more navigation icons 212 than can be effectively displayed in the navigation region 206, or more content elements 214 than can be effectively displayed in the content display region 208. In such cases, only a subset of navigation icons 212 or a subset of content elements 214 may be displayed at once, and a user can reveal other navigation icons 212 or content elements 214 by scrolling. Similarly, if a single content element 214 is too large for the content display region 208, only a portion may displayed and the user can scroll to access other portions of that content element 214.

As will be explained in more detail below, the browser-executable software program resulting from step 104 of the method 100 is not an independent software program running directly on the operating system of the remote networked mobile wireless telecommunication computing device. Rather, the browser-executable software program will execute within a browser running on the operating system of the remote networked mobile wireless telecommunication computing device. The browser-executable software program will cause the browser to present the mobile application interface façade to the user, preferably with the mobile application interface façade occupying all or substantially all of the screen without any of the browser user interface being visible. Where the mobile application interface façade follows the convention for mobile applications shown in FIG. 2, it will appear to the user that he or she is using a mobile application rather than a Web page within a browser. Although it is preferred that the mobile application interface façade follows the convention shown in FIG. 2, this is not necessary and the mobile application interface façade may present any suitable user interface.

Figure 3:
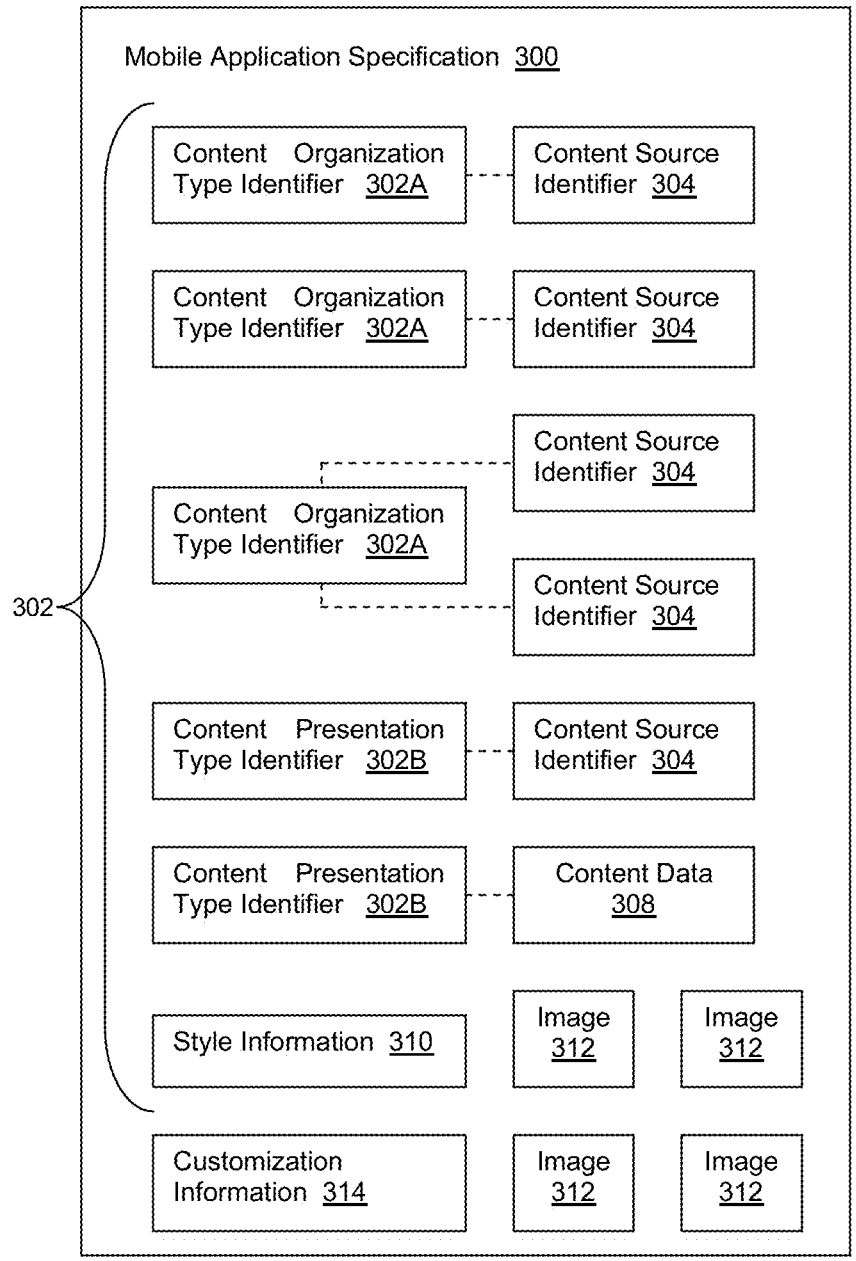
FIG. 3 is a schematic representation of an exemplary mobile application specification.

Reference is now made to FIG. 3, which is a schematic representation of an exemplary mobile application specification 300 of the type received at step 102 of the method 100 in FIG. 1. The mobile application specification 300 may be generated, for example, by filling out an HTML form on a remote computer system 604 (FIG. 6) and transmitting it to the computer system 600 (FIG. 6) that will implement the method 100.

The mobile application specification 300 comprises at least one and preferably a plurality of content component type identifiers 302 each identifying a predetermined content component type. As explained further below, the system 600 (FIG. 6) that generates browser-executable software programs 602 (FIG. 6) to present a web page as a mobile application will support certain predetermined content component types, and will store a code generation template 500 (FIG. 5) for each such content component type. The content component types comprise content organization types and content presentation types, and the content component identifiers 302 comprise content organization type identifiers 302A and content presentation type identifiers 302B, each of which is described in further detail below.

The mobile application specification 300 further comprises one or more content source identifiers 304, with each content source identifier 304 associated with one of the of content component type identifiers 302. As will be explained further below, each content organization type identifier 302A has at least one content source identifier 304 associated therewith, and each content presentation type identifier 302B has either a content source identifier 304 or content data 308 associated therewith. Each content source identifier 304 will identify a content source, e.g. a location on the Web, from which can be retrieved content according to the content component type identified by the associated content component type identifier 302. In the simplest case, the content source identifier 304 may be a uniform resource locator (URL); the content source identifier 304 may however be any suitable identifier that enables a URL for the relevant content source to be determined. For example, the content source identifier 304 may be a Twitter handle or a Facebook name.

The mobile application specification 300 may further comprise style information 310 specifying aspects of the desired appearance of the web page that will be presented as a mobile application along with one or more images 312 that may be included, for example as a splash screen or as an icon. The style information 310 and images 312 are optional, as the web page that will be presented as a mobile application may use a default style and default images.

Each content organization type identifier 302A identifies a particular content organization type. As used herein, the term "content organization type" refers to a pre-existing content organization scheme that is used on the Web and for which content is published according to a known application programming interface (API). Depending on the particular content organization scheme, a content organization type may be the entire content organization scheme or may be a portion thereof. For example, content posted by users at the Facebook web site may include status updates, event listings and photo albums, and each of these may be treated as a separate content organization type rather than treating all Facebook content as a single content organization type.

Preferably the API for a particular content organization scheme is known because it is a published API; typically in such cases the API will be published by the creator of the particular content organization scheme. For example, Twitter, Identi.ca, Flickr, Facebook, Foursquare, Vimeo, Wufoo as well as YouTube and certain Google services all have published APIs. In other cases a content organization type may be a content organization scheme for which no official API has been published but for which a sufficiently accurate API has been empirically determined. Optionally, a standardized API may be developed for use with less common content organization schemes or with content organization schemes for which there is no suitable outward facing API, in such cases an extension can be installed by a content publisher to present the content according to the standardized API, or the content publisher may develop and interpose a translation layer which converts from the native API of that content organization scheme into the standardized API. The use of a standardized API allows a content publisher to make their content available to be presented by an automatically generated browser-executable software program as described herein.

Illustrative examples of content organization types that may be defined in association with the systems, methods and computer program products described herein include, but are not limited to, the following:

| Content Organization Type | Description |
| --- | --- |
| CMS Blog | Blog content from a content management system (CMS) such as Joomla, WordPress, or others. |
| Static Page | Static web page content. |
| Directory Content | A directory-style list of CMS content. |
| Welcome Page | A landing page from a CMS. |
| Twitter Search Term | A list of Twitter posts ("tweets") containing a specified search term. |
| Twitter User Stream | The user stream of tweets for a specified Twitter account. |
| Identi.ca Search Term | A list of Identi.ca statuses from a specified search term. |
| Facebook Status/Wall | A list of public Facebook status/timeline messages from a specified page or profile. |
| Facebook Events | A list of all upcoming publicly available items on a specified Facebook page or profile. |
| Facebook Albums | A list of all public Facebook albums associated with a specified Facebook page or profile. |
| Flickr Photosets | A list of all public photosets associated with a specified Flickr account. |
| Flickr Photostream | A list of the last few public images posted to a specified Flickr account. |

| Content Organization Type | Description |
| --- | --- |
| Picasa Albums | A list of all public Picasa albums associated with a specified Google account. |
| Foursquare Venue Photos | A list of all the public Foursquare photos associated with a specified venue. |
| YouTube Channel Videos | A list of all the public videos posted by a specified YouTube user. |
| YouTube Playlist Videos | A list of all the public videos posted to a specified YouTube playlist. |
| Vimeo Video Channel | A list of all the public videos posted in a specified Vimeo channel. |
| Wufoo Forms | A list of all of the supported forms associated with a specified Wufoo account (requires API Key from Wufoo). |
| Google Calendar | A list of all upcoming items on a specified public Google Calendar. |

As will be explained below, in general the retrieved content for a particular content organization type will be presented by the browser-executable software program 602 (FIG. 6) resulting from the method 100 using a predetermined presentation format. Optionally, the presentation format for the retrieved content for a particular content component type may be customized, and customization information 314 associated with a particular content component type identifier 302 may be included in the mobile application specification 300.

Each content presentation type identifier 302B identifies a particular content presentation type. A "content presentation type" is a presentation format for particular content; typically such content is retrieved from the Web. Where a content source identifier 304 is associated with a content presentation type identifier 302B, the relevant content may be retrieved according to that content source identifier 304. Where the mobile application specification 300 includes content data 308, the computer system 600 (FIG. 6) implementing the method 100 may place that data on the Web at a known location and in a known format for later retrieval. Although both content organization types and content presentation types will result in the relevant content being presented by the browser-executable software program 602 (FIG. 6) using a predetermined presentation format, content organization types focus on how the content is organized at its source while content presentation types focus on how the content is presented.

Illustrative examples of content presentation types that may be defined in association with the systems, methods and computer program products described herein include, but are not limited to, the following:

| Content Presentation Type | Description |
| --- | --- |
| Contact | Displays contact details, tap-to-call, contact form, map, address. |
| About | Provides bibliographic and related information. |
| Geotagged Map Content | Presents information on a map based on the current location of the networked mobile wireless telecommunication computing device, as determined from its geolocating system. |
| Geotagged List of Nearby Locations | Presents information in a list based on the current location of the networked mobile wireless telecommunication computing device, as determined from its geolocating system. |

Figure 4:
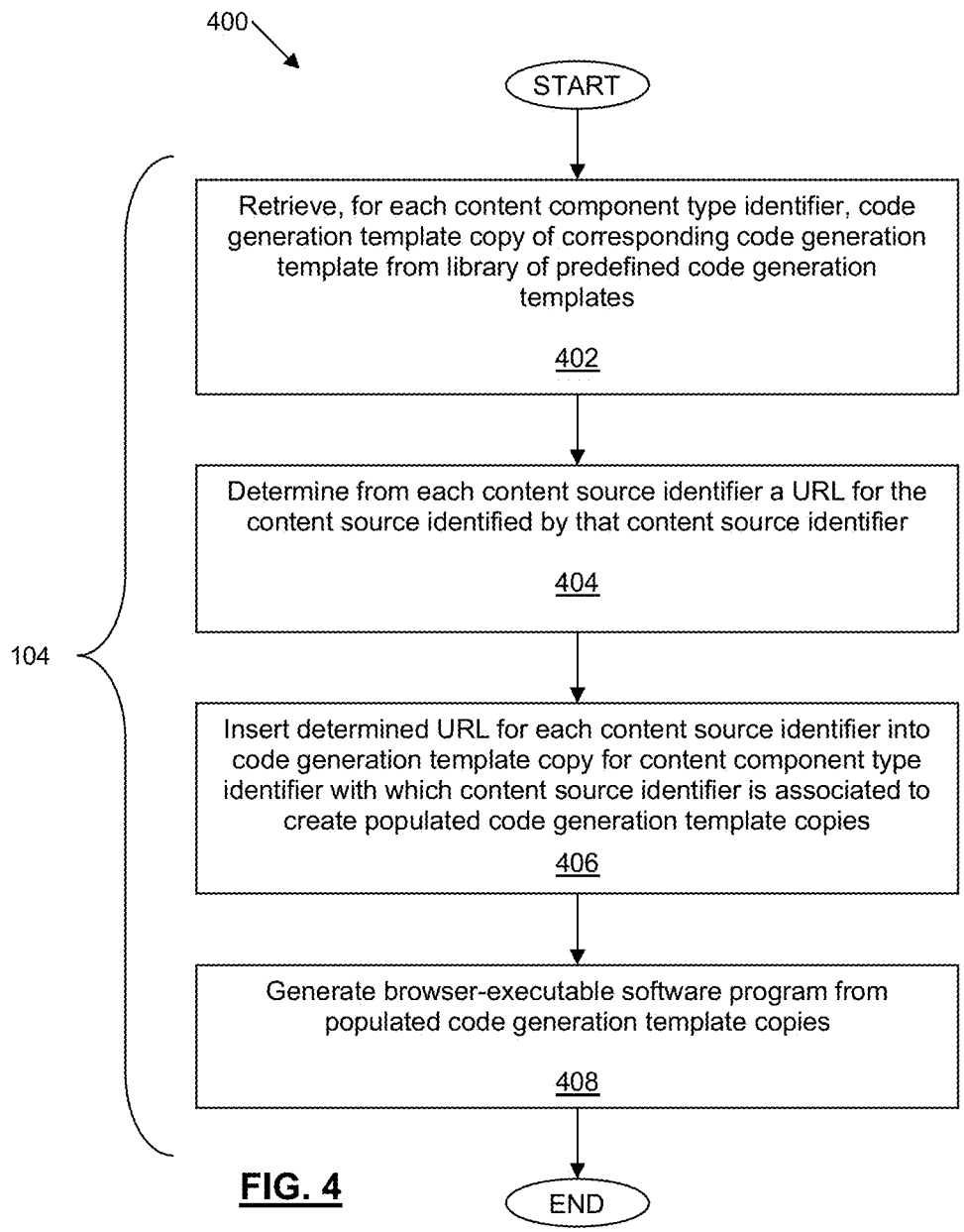
FIG. 4 is a flow chart illustrating an exemplary method for automatically generating a browser-executable software program from a mobile application specification.
Figure 5:
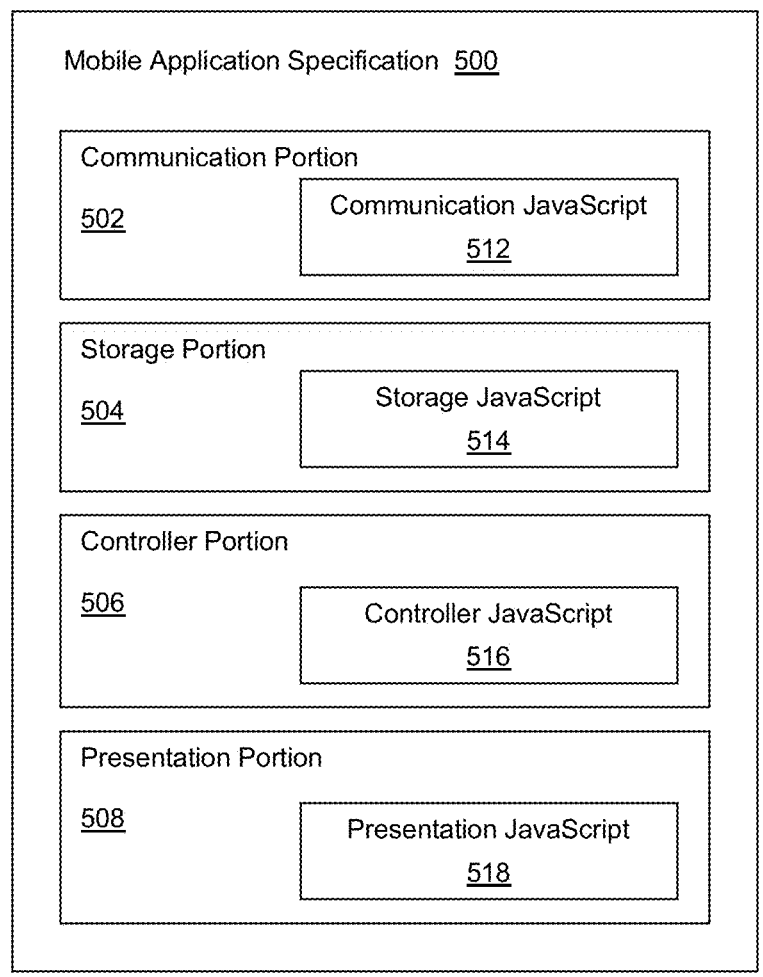
FIG. 5 is a schematic representation of an exemplary code generation template.
Figure 6:
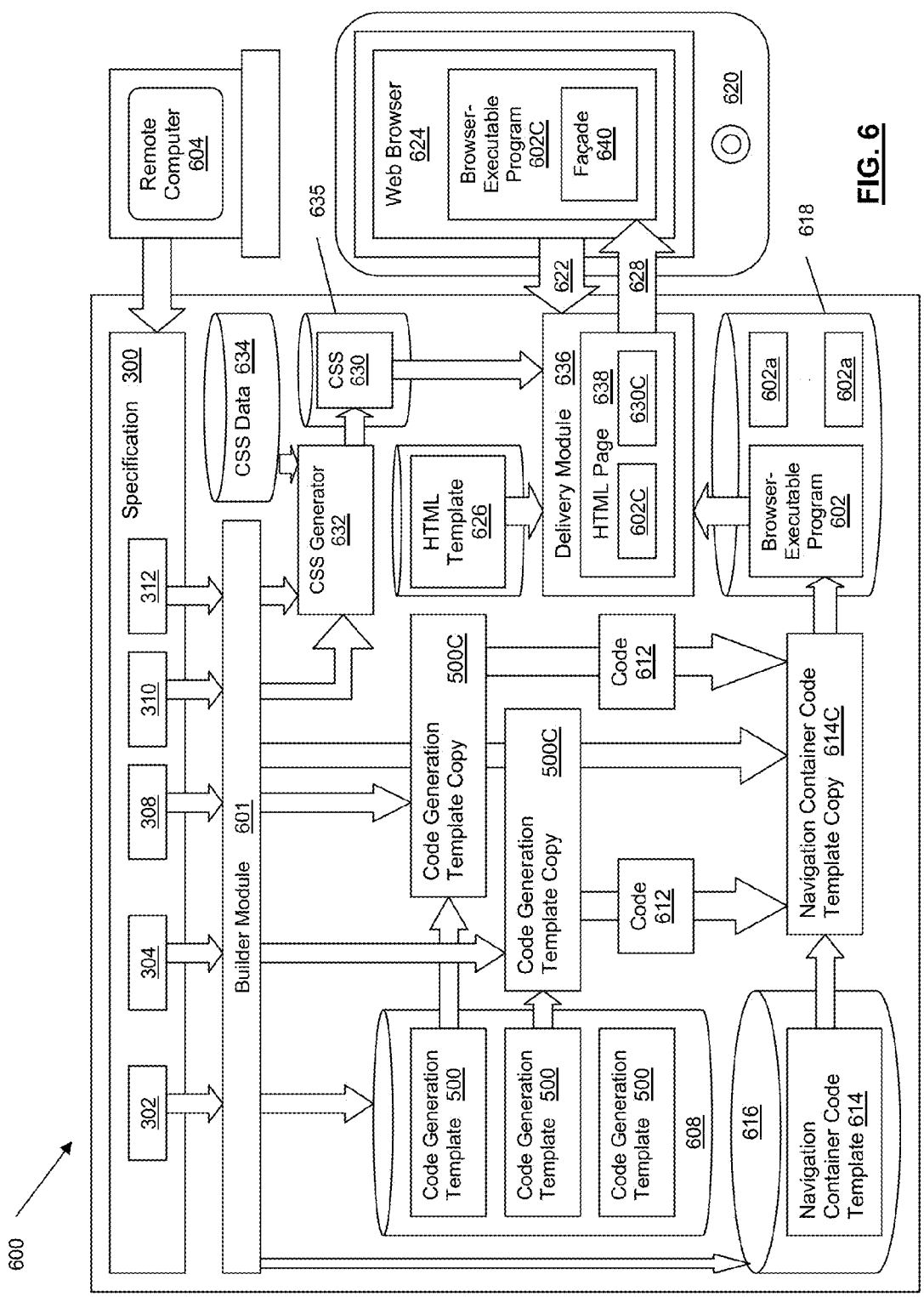
FIG. 6 is a schematic representation of an exemplary system for generating a browser-executable software program to present a web page as a mobile application.

Reference is now made primarily to FIG. 4, which shows a flow chart 400 illustrating in more detail an exemplary implementation of step 104 of the method 100 in FIG. 1, to FIG. 5, which shows an exemplary code generation template 500, and to FIG. 6, which is a schematic representation of a system 600 for generating a browser-executable software program 602 to present a web page as a mobile application.

In the exemplary embodiment illustrated in FIGS. 4, 5 and 6, step 104 of the method 100 in FIG. 1, namely automatically generating a browser-executable software program from the mobile application specification 300 (FIG. 3), is carried out as described below.

The system 600 stores a code generation template 500 corresponding to each supported content component type, i.e. each supported content organization type and content presentation type, and these code generation templates 500 are used to generate browser-executable program code for that content component type. At step 402, the method 400 retrieves, for each content component type identifier 302 (FIG. 3), a copy 500C of a corresponding code generation template 500 from a library 608 of predefined code generation templates 500. Where only a single content component type identifier 302 is included in the mobile application specification 300, only a single code generation template copy 500C will be retrieved; where the mobile application specification 300 includes a plurality of content component type identifiers 302 then a plurality of separate code generation template copies 500C will be retrieved as shown in FIG. 6.

At step 404, the method 400 determines from each content source identifier 304 a URL for the content source identified by that content source identifier 304. In the simplest case, the content source identifier 304 is or includes a URL and the determination is a simple matter of extracting the URL from the content source identifier 304. The content source identifier may also be a unique identifier associated with a content organization type, such as a Twitter handle or a Facebook name; in such cases the API for that content organization type may be used to determine the URL by applying the API rules to the unique identifier.

At step 406, the method 400 inserts the determined URL for each content source identifier 304 into the code generation template copy 500C for the content component type identifier 302 with which that content source identifier 304 is associated to generate populated code generation template copies 500C. In general, there will be at least one content source identifier 304 associated with each content organization type identifier 302A and there may also be additional content source identifiers 304 associated with one or more of the content presentation type identifiers 302B. Some code generation template copies 500C may receive only a single URL while others may receive more than one; this will depend on the nature of the content component type to which the code generation template 500 corresponds.

Referring now to FIG. 5, an exemplary code generation template 500 is shown schematically. In the illustrated embodiment, the code generation templates 500 comprise PHP computer-usable program code which, when a populated copy 500C of the code generation template 500 is executed, outputs JavaScript computer-usable program code that will form part of the browser-executable software program 602 and provide functionality within the browser of a networked mobile wireless telecommunication computing device. PHP is a general purpose scripting language suitable for Web development, and JavaScript is a prototype-based scripting language that can be implemented within a browser to manipulate the appearance of the browser and the Web page and thereby present a desired user interface. Other suitable general purpose scripting languages besides PHP may also be used for code generation templates, such as Python, Perl, ASP or others, or a suitable general purpose programming language, such as C or C++, that has sufficient functionality for server-side operations may also be used.

The exemplary code generation template 500 shown in FIG. 5 comprises a communication portion 502, a storage portion 504, a controller portion 506 and a presentation portion 508. Generally speaking, the JavaScript program code that will eventually form part of the browser-executable software program 502 is encapsulated as JavaScript program code units within the PHP program code, and the PHP program code, when the populated copy 500C of the code generation template 500 is executed, identifies the appropriate JavaScript units and assembles them. Thus, for a given code generation template 500, one or more communication JavaScript units 512 are encapsulated within the communication portion 502, one or more storage JavaScript units 514 are encapsulated within the storage portion 504, one or more controller JavaScript units 516 are encapsulated within the controller portion 506 and one or more presentation JavaScript units 618 are encapsulated within the presentation portion 508.

The populated copy of the communication portion 502 of each code generation template 500 will, when the populated copy 500C thereof is executed, output communication JavaScript that will be used to transmit content requests, such as HTTP "get" or "post" requests from the browser software program to the URL that was inserted into the code generation template 500 at step 406 of the method 400, and to receive content in response to the content request. The URL for the content source is typically inserted into the copy of the communication portion 502 so that the communication JavaScript outputted by the populated copy 500C of the code generation template 500 can direct the content requests to the URL. The URL may be provided to the communication portion 602 of each code generation template 500 as a variable.

When the populated code generation template copy 500C is executed, the copy of the storage portion 504 included in the copy 500C outputs storage JavaScript that will be used to store, in a memory of the networked mobile wireless telecommunication computing device, the content received in response to a content request. The storage portion 504 of each code generation template 500 associated with a content organization type identifier 302A will be highly dependent on the content organization type, as the storage JavaScript output by the storage portion 504 will receive content organized according to that content organization type; typically the storage JavaScript will include a data map for isolating desired elements from the returned content. For example, the storage JavaScript 514 encapsulated in the storage portion 504 of the code generation template 500 for a "Facebook wall" may be configured to identify and store only status updates and not photos or videos, for example to limit storage requirements. The encapsulated storage JavaScript 514 in the storage portion 504 will usually be based on the API for the corresponding content organization type, whether published or determined empirically, or may be based on a standardized API as described above.

The copy of the controller portion 506 of each code generation template 500, when the populated copy 500C thereof is executed, outputs controller JavaScript that will receive user input and determine a view according to the user input, and execution of the copy of the presentation portion 508 of the populated copy 500C outputs presentation JavaScript that will present the content within the mobile application interface façade 640. The presentation portion 508 of each code generation template 500 will also be highly dependent on the content component type (either a content organization type or a content presentation type), since the presentation JavaScript generated by the presentation portion 508 will typically have to drive the browser 624 to display the relevant content according to the relevant content component type. For example, some content component types may include video or image files while other content component types may not, and the presentation format on the networked mobile wireless telecommunication computing device 620 should correspond sensibly to the presentation format of the same content on a desktop or laptop computer.

Optionally, for certain content presentation types for which content data 308 is included in the mobile application specification, instead of the content data 308 being placed on the Web at a known location and in a known format, the content data 308 can be inserted into the relevant code generation template copy 500C (FIG. 6) so that the content data 308 will be embedded in the presentation JavaScript. In such cases, the communication portion and the storage portion may be omitted from the code generation template for that content presentation type.

Returning now to FIG. 4, at step 408, the method 400 shown in FIG. 4 generates the browser-executable software program 602 from the populated code generation template copies 500C.

Steps 402, 404 and 406 and 408 may be performed in any suitable order. For example, the URLs can be determined (step 404) before, during or after retrieval of the code generation template copies 500C (step 402), and the URLs, once determined, may be inserted (step 406) into each code generation template copy 500C as it is retrieved or insertion may be delayed until all code generation template copies 500C have been retrieved. Similarly, browser-executable program code may be generated from each populated code generation template copy 500C immediately after insertion of the URL in that code generation template copy 500C or only after all code generation template copies have been populated.

Now referring specifically to FIG. 6, in the illustrated embodiment, a remote computer system 604 transmits a mobile application specification 300 to the system 600, which includes a builder module 601 for controlling generation of the browser-executable software program 602. Although only a single builder module 601 is shown in FIG. 6, in other embodiments a plurality of builder modules may be used, with each builder module performing one or more functions.

Figure 7:
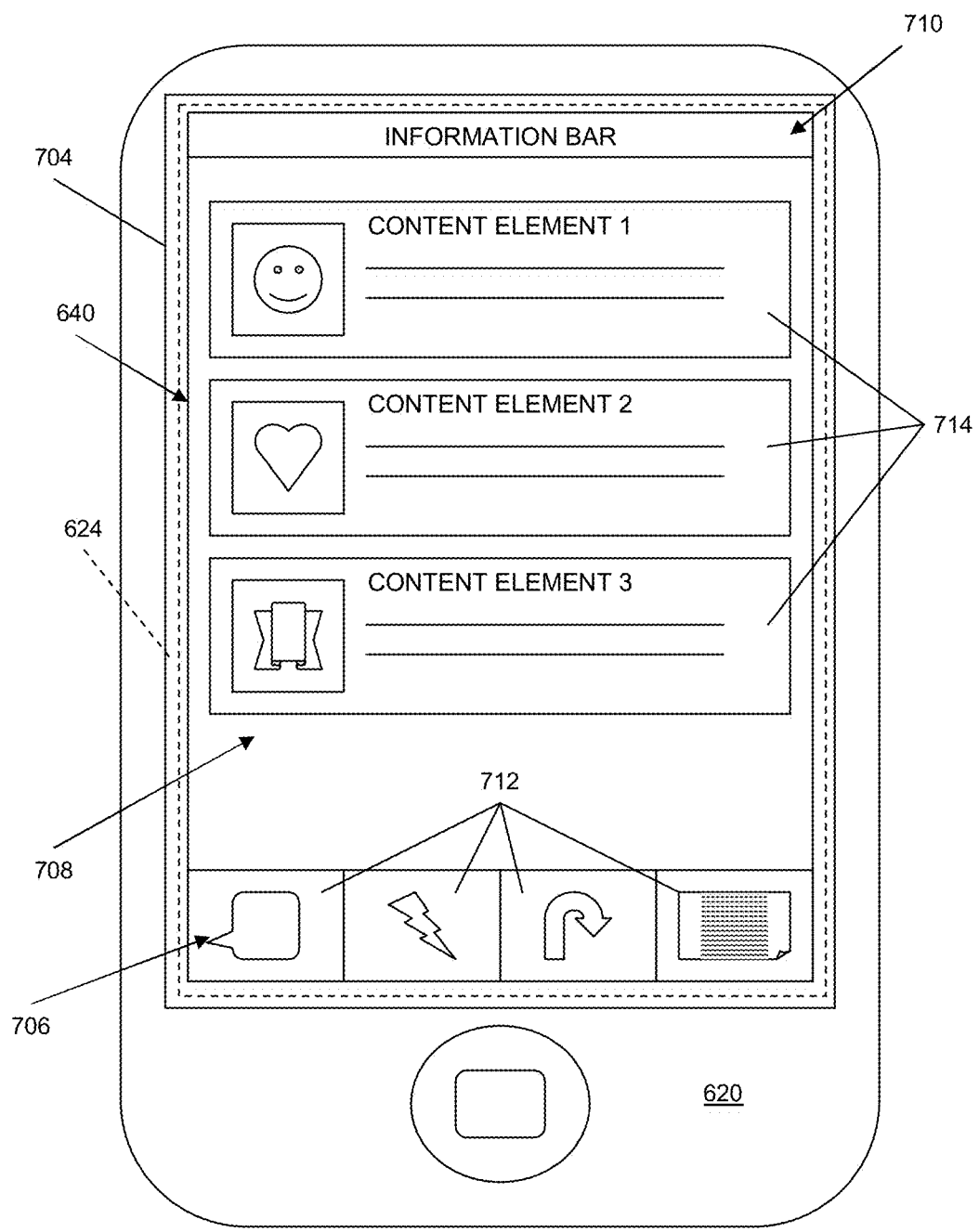
FIG. 7 shows a networked mobile wireless telecommunication computing device running a browser, with a browser-executable software program running in the browser and presenting its mobile application interface façade.

The builder module 601 obtains the component type identifier(s) 302 and the associated content source identifier(s) 304 and/or content data 308 from the mobile application specification 300. For each content component type identifier 302 (FIG. 3) in the mobile application specification 300, the builder module 601 retrieves a copy 500C of the corresponding code generation template 500 from the library 608 of predefined code generation templates 500. The builder module 601 extracts the URL(s) from the content source identifiers 304 and inserts each URL into the appropriate code generation template copy 500C, as well as inserting any content data 308, or a URL linking thereto, into the appropriate code generation template copy 500C, to produce populated code generation template copies 500C. The builder module 601 also retrieves a copy 614C of a navigation container code template 614 from a navigation container code storage 616, and populates the navigation container code template copy 614C with information from the mobile application specification 300, including, for example, titles for various screens and identifiers for navigation icons 712 (FIG. 7). The builder module 601 then causes the populated code generation template copies 500C to be executed to produce JavaScript program code 612, and embeds the JavaScript program code 612 in the populated navigation container code template copy 614C.

The navigation container code template 614, and hence the navigation container code template copy 614C, is also JavaScript program code and defines the organization of the mobile application interface façade 640, as described further below. The navigation container code 614 defines a layout of the mobile application interface façade 640, including the size, shape and screen position of the navigation region 706 (FIG. 7), content display region 708 (FIG. 7) and information bar 710 (FIG. 7). As such, the navigation container code 614 comprises an initial portion and a terminal portion, and the builder module 601 inserts the JavaScript program code 612 output from execution of the code generation template copies 500C between the initial portion and the terminal portion of the navigation container code template copy 612C to produce the completed browser-executable software program 602, in JavaScript. The builder module 601 then stores the browser-executable software program 602 in a program library 618 for later transmission to a requesting networked mobile wireless telecommunication computing device.

The order of execution of the code generation template copies 500C will determine the order in which navigation icons 712 (FIG. 7) are arranged in the mobile application interface façade 640. Although the order of execution of the code generation template copies 500C may be predetermined or random, preferably a desired arrangement of navigation icons is included in the mobile application specification 300 and the desired arrangement is used to determine the order of execution of the code generation template copies 500C. Where there are multiple code generation template copies 500C, the JavaScript program code 612 output by execution of the second and each subsequent code generation template copy 500C is appended to the JavaScript program code 612 output by the preceding code generation template 500C.

Preferably, as part of the storage process the competed browser-executable software program 602 is minified for efficiency of transmission. Optionally, the completed browser-executable software program 602 may be obscurified or obfuscated.

As noted above, the mobile application specification 300 may include style information 310 (FIG. 3) specifying aspects of the desired appearance of the web page 638 that will be presented as a mobile application along with one or more images 312. The style information 310 may include specifications of size, color, font, animation and the like. In addition, the style information 310 (FIG. 3) may also include identification of graphics for the navigation icons 712 (FIG. 7). For example, a user may be permitted to choose from a plurality of different predefined graphics for a navigation icon 712 corresponding to a given content component type identifier 302 (FIG. 3). When the mobile application specification 300 is received, the builder module 601 obtains the style information 310 and any images 312 and passes them to a cascading style sheet (CSS) generator 632. The CSS generator 632 uses the style information 310 to determine which CSS elements to retrieve from a CSS data library 634. The CSS generator 632 then uses the retrieved CSS elements, along with any images 312, to create a CSS 630 corresponding to the browser-executable software program 602, and stores the CSS in a CSS storage 635. Optionally, a default CSS may be used, in which case the CSS generator 632 may be omitted.

Although FIG. 6 shows creation of only a single browser-executable software program 602 and associated CSS 630, this is simply for ease of illustration. The system 600 shown in FIG. 6 may be used to create and simultaneously store a plurality of different browser-executable software programs 602, 602a ... 602n and associated cascading style sheets 630 (only one of which is shown), and a copy of any one of the plurality of different browser-executable software programs 602, 602a ... 602n may be provided to a networked mobile wireless telecommunication computing device 620 in response to a request designating that particular browser-executable software program.

Continuing to refer to FIG. 6, in the illustrated embodiment a networked mobile wireless telecommunication computing device 620, which is different from the remote computer 604, transmits a request 622 to the system 600 for a web page that is to be presented as a mobile application. The request 622 is transmitted by the browser 624, and may take the form of a URL, such as www.weeverapp.com/apps/NAME. Typically the program library 618 will store a plurality of different browser-executable software programs 602, 602a ... 602n, and "NAME" designates the desired browser-executable software program 602 and can be extracted from the URL and used to determine which browser-executable software program 602, 602a ... 602n to return. The request 622 is received by a delivery module 636, which obtains a copy of an HTML template 626 and populates it, and then retrieves a copy 630C of the corresponding CSS 630 and a copy 602C of the designated browser-executable software program 602 and integrates them into the populated copy of the HTML template 626 to create an HTML page 638. The HTML page includes the CSS copy 630C and the browser-executable software program copy 602C, and is returned by the delivery module 636 to the browser 624 on the networked mobile wireless telecommunication computing device 620 as a response 628 to the request 622.

In one embodiment, where the browser-executable software program 602 is intended for use on a networked mobile wireless telecommunication computing device 620 having a touch screen, the HTML page 638 will include a reference to a suitable library of JavaScript touch screen functions. Examples of suitable libraries include Sencha Touch (http://www.sencha.com/products/touch), offered by Sencha Inc., 1700 Seaport Boulevard Suite 120, Redwood City, Calif. 94063 USA, jQuery Mobile (http://jquerymobile.com) and jQTouch (http://www.jqtouch.com). The referenced library will contain JavaScript functions that are called by the browser-executable software program 602; alternatively the required functions may be included within the JavaScript encapsulated in the code generation templates 500. The references to the library of JavaScript touch screen functions may be added when populating the copy of the HTML template 626, allowing for version updates.

The HTML page 638 returned to the browser 624, may include an image file for use as a launch icon on a main screen of the networked mobile wireless telecommunication computing device 620 as well as a title, which can be embedded in the title tag of the HTML page 638. Where the browser 624 and/or operating system of the networked mobile wireless telecommunication computing device 620 provides an inbuilt "add to home screen" or similar function, an icon comprising the image from the image file and the title can be made to appear on the main screen of the networked mobile wireless telecommunication computing device 620. The icon will reference the URL that specifies the desired browser-executable software program 602, and activating this icon will, in accordance with the inbuilt functionality of the browser 624 and/or operating system, launch the browser 624 (if the browser 624 is not already running) and cause the browser 624 to request the URL that specifies the desired browser-executable software program 602.

The browser-executable software program 602 can run in any suitable browser; preferably the JavaScript of the browser-executable software program 602 is configured to use the functionality of WebKit-based browsers, which are in common use on many networked mobile wireless telecommunication computing devices. It is within the capability of one skilled in the art, now informed by the herein disclosure, to adapt a JavaScript program for use in non-WebKit-based browsers.

The browser-executable software program 602, and hence each copy 602C thereof, defines a mobile application interface façade 640 which will preferably make the browser 624 in which the browser-executable software program 602 is executing appear to the user as a mobile application. More particularly, when executing in the browser 624, the browser-executable software program 602 will drive the browser 624 to present the mobile application interface façade 640 as the user interface to the browser-executable software program 602. The mobile application interface façade 640 comprises a display layout structure for selectively displaying content on a screen of a networked mobile wireless telecommunication computing device.

Reference is now made to FIG. 7, which shows the networked mobile wireless telecommunication computing device 620 of FIG. 6 running the browser 624, with the browser-executable software program 602 running in the browser 624 and presenting its mobile application interface façade 640. Preferably, even though the browser-executable software program 602 is running in the browser 624, the mobile application interface façade 640 will occupy all or substantially all of the screen 704, without any of the user interface of the browser 624 being visible, hence the browser 624 is shown with dashed lines in FIG. 7. Alternatively the mobile application interface façade 640 may appear within the main window (not shown) of the browser 624.

Preferably, the mobile application interface façade 640 follows the convention for the appearance and interaction features of mobile applications shown and described in FIG. 2. Thus, the mobile application interface façade 640 which acts as the user interface to the browser-executable software program 602 comprises a navigation region 706 in the form of a bar extending along the bottom of the screen 704, an information bar 710 extending along the top of the screen 704, and a content display region 708 occupying the remainder of the screen 704 between the navigation region 706 and the information bar 710. Navigation icons 712 appear within the navigation region 706, with each navigation icon 712 indicating a content type symbolically, textually or both. One or more content elements 714 are displayed in the content display region 708. Where there are more navigation icons 712 than can be effectively displayed in the navigation region 706, or more content elements 714 than can be effectively displayed in the content display region 708, only a subset are displayed and the user may scroll to access the remainder.

Each of the navigation icons 712 corresponds to a content component type identified by one of the content component type identifiers 302 (FIG. 3). By activating a particular navigation icon 712, such as by pressing on the icon in the case of a touch screen device, a user can cause the browser 624 to present content obtained using one or more URLs derived from the content source identifier(s) 304 associated with the corresponding content component type identifiers 302. For example, one or more content elements 714 based on the content retrieved from the URL(s) may be displayed in the content display region 708 in response to a selection, and selection of one of the content elements 714 may present further content retrieved from the associated URL.

Control of the browser-executable software program 602 via the mobile application interface façade 640 is accomplished by the controller JavaScript, communication JavaScript, storage JavaScript and presentation JavaScript generated by executing the code generation template copy 500C corresponding to the content component type to which the navigation icon 712, and the associated content elements 714, correspond. Activation of the relevant navigation icon 712 or content element 714 is detected by the controller JavaScript. The controller JavaScript then sends a signal to the communication JavaScript, and the communication JavaScript then sends a content request for the relevant content. The relevant portions of the content received in response to the content request are stored by the storage JavaScript, with such storage being detected by the controller JavaScript. The controller JavaScript then notifies the presentation JavaScript, which retrieves the stored content and presents it on the screen 704 of the networked mobile wireless telecommunication computing device 720, and may also invoke other hardware, such as speakers.

Thus, a browser-executable software program for presenting a web page that provides the "look and feel" and functionality of a mobile application can be automatically generated from a mobile application specification that identifies one or more predetermined content component types and one or more associated content sources.

Each predefined code generation template 500 for a given content organization type is based on the API (published, determined empirically or standardized) for that content organization type as well as a desired presentation format, and automatically generates JavaScript program code that appropriately requests, stores and presents content according to that content organization type. Similarly, each code generation template 500 for a given content presentation type is developed based (at least) on the desired presentation format and automatically generates JavaScript program code that presents the data appropriately. The resulting JavaScript 612 is then automatically embedded in a populated copy 614C of a JavaScript navigation container code template 614 to create a complete browser-executable software program 602. Thus, a person wishing to create a browser-executable software program to present a web page as a mobile application need not be familiar with JavaScript (or any other programming language). The use of one or more predefined HTML templates 626 that is automatically populated by the delivery module 636 also avoids the need for this person to have any knowledge of HTML programming, and the CSS generator 632 can automatically build a CSS 630 so as to avoid any need for this person to be familiar with CSS methodology. Accordingly, the system 600 enables a person having no familiarity with JavaScript, HTML or CSS methodology to create a browser-executable software program to present a web page as a mobile application. All the person needs to do is specify the particular content component types he or she wishes to use and the sources of the corresponding content and optionally provide style information and images. This information may be obtained simply by having the person fill out an HTML form on a remote computer system 604 and transmit it to the system 600.

Any suitable networked mobile wireless telecommunication computing device, such as a smartphone, tablet computer or the like may be used in accordance with the systems, methods and computer program products disclosed herein.

Figure 8:
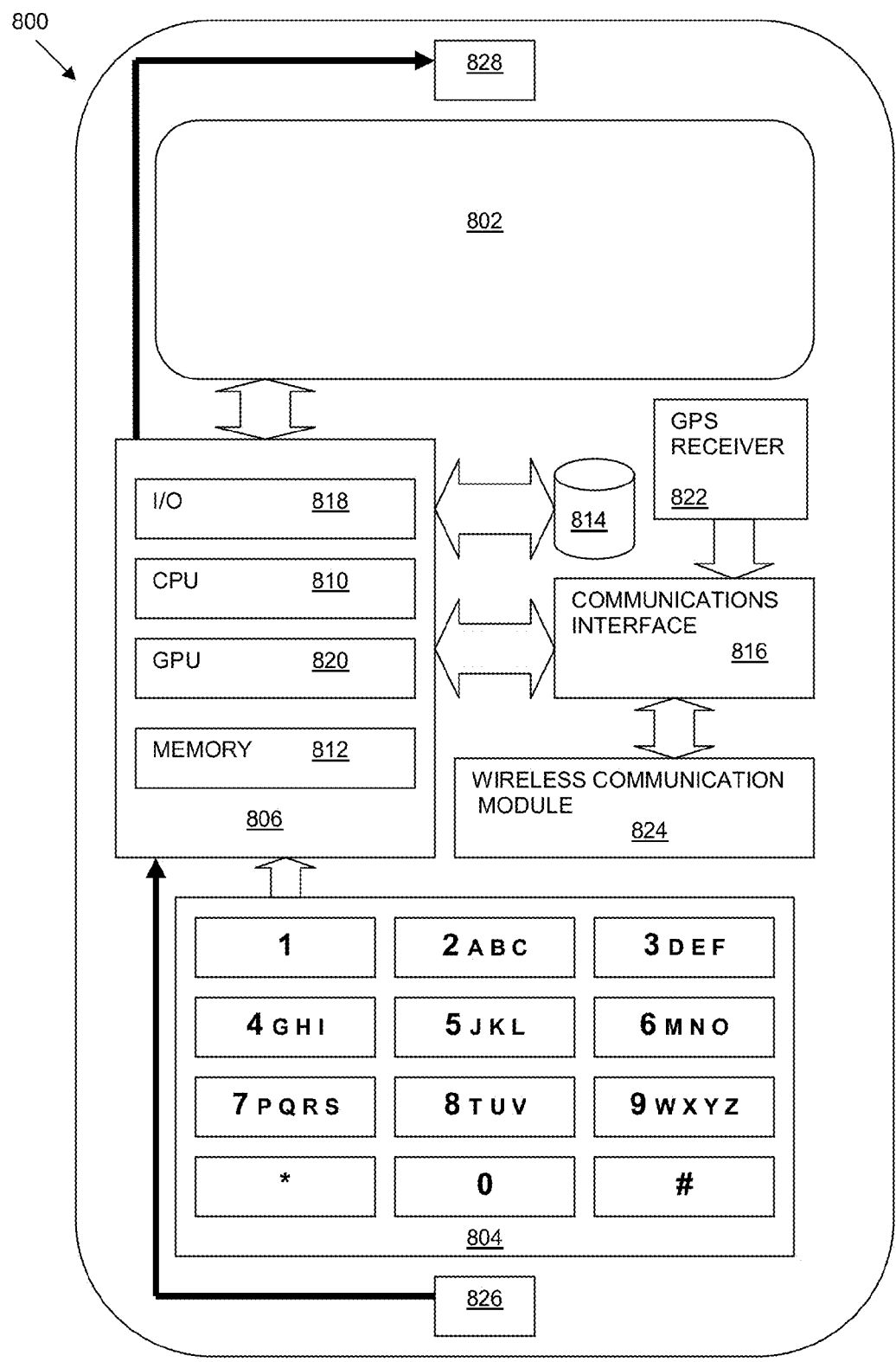
FIG. 8 is a schematic representation of an exemplary smartphone.

FIG. 8 shows an exemplary networked mobile wireless telecommunication computing device in the form of a smartphone 800. The smartphone 800 includes a display 802, an input device in the form of keyboard 804 and an onboard computer system 806. The display 802 may be a touchscreen display and thereby serve as an additional input device, or as an alternative to the keyboard 804. The onboard computer system 806 comprises a central processing unit (CPU) 810 having one or more processors or microprocessors for performing arithmetic calculations and control functions to execute software stored in an internal memory 812, preferably random access memory (RAM) and/or read only memory (ROM) is coupled to additional memory 814 which will typically comprise flash memory, which may be integrated into the smartphone 800 or may comprise a removable flash card, or both. The smartphone 800 also includes a communications interface 816 which allows software and data to be transferred between the smartphone 800 and external systems and networks. The communications interface 816 is coupled to one or more wireless communication modules 824, which will typically comprise a wireless radio for connecting to one or more of a cellular network, a wireless digital network or a Wi-Fi network. The communications interface 816 will also typically enable a wired connection of the smartphone 800 to an external computer system. A microphone 826 and speaker 828 are coupled to the onboard computer system 806 to support the telephone functions managed by the onboard computer system 806, and GPS receiver hardware 822 is also coupled to the communications interface 816 to support navigation operations by the onboard computer system 806. Input and output to and from the onboard computer system 806 is administered by the input/output (I/O) interface 818, which administers control of the display 802, keyboard 804, microphone 826 and speaker 828. The onboard computer system 806 may also include a separate graphical processing unit (GPU) 820. The various components are coupled to one another either directly or by coupling to suitable buses.

The methods described herein may be implemented on any suitable computer or microprocessor-based system, including a distributed system comprising a plurality of individual computers coupled to one another. An illustrative computer system in respect of which the methods herein described may be implemented is presented as a block diagram in FIG. 9. The illustrative computer system is denoted generally by reference numeral 900 and includes a display 902, input devices in the form of keyboard 904A and pointing device 904B, computer 906 and external devices 908. While pointing device 904B is depicted as a mouse, it will be appreciated that other types of pointing device may also be used.

Figure 9:
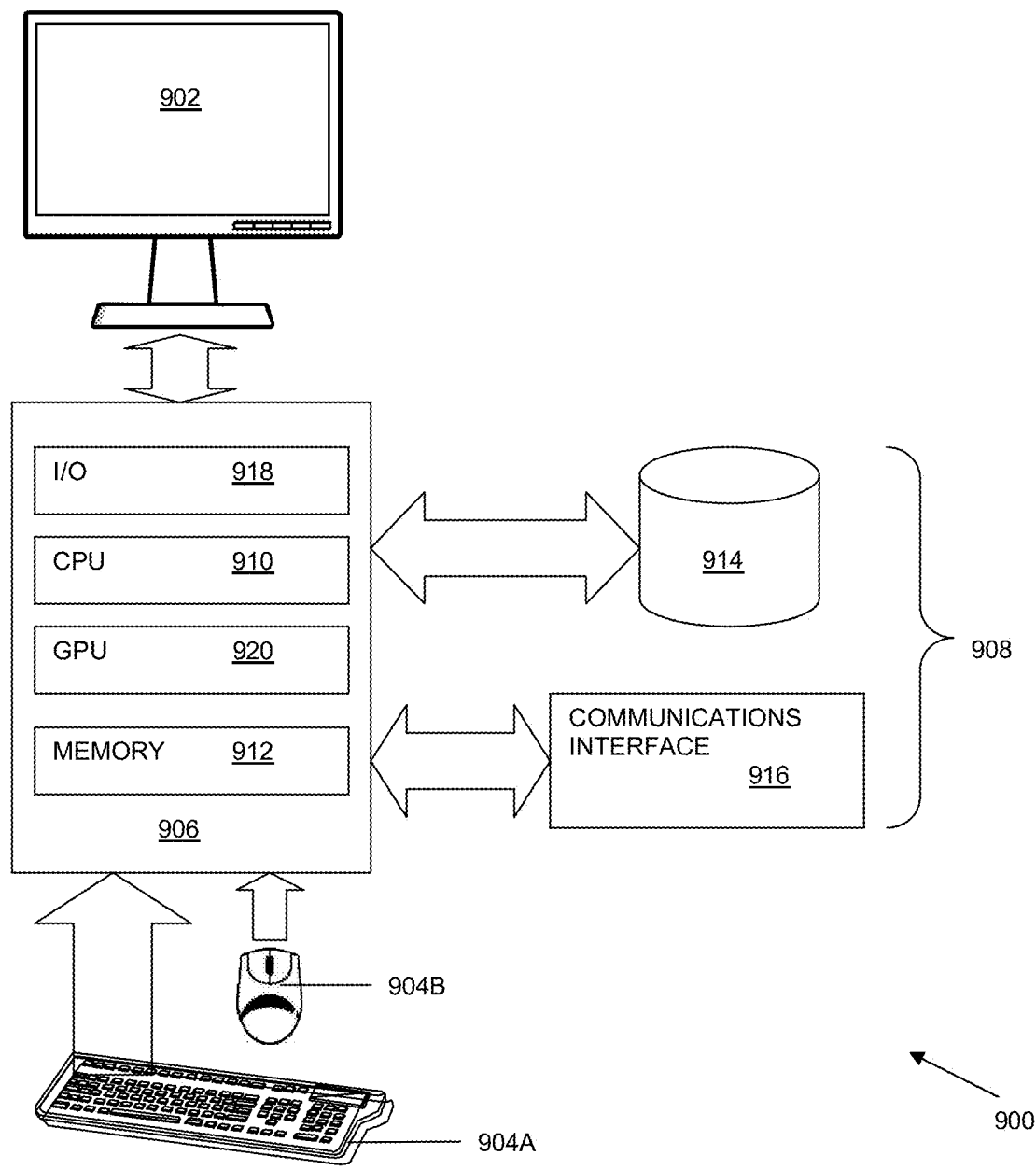
FIG. 9 is a schematic representation of an exemplary computer system.
Figure 3:
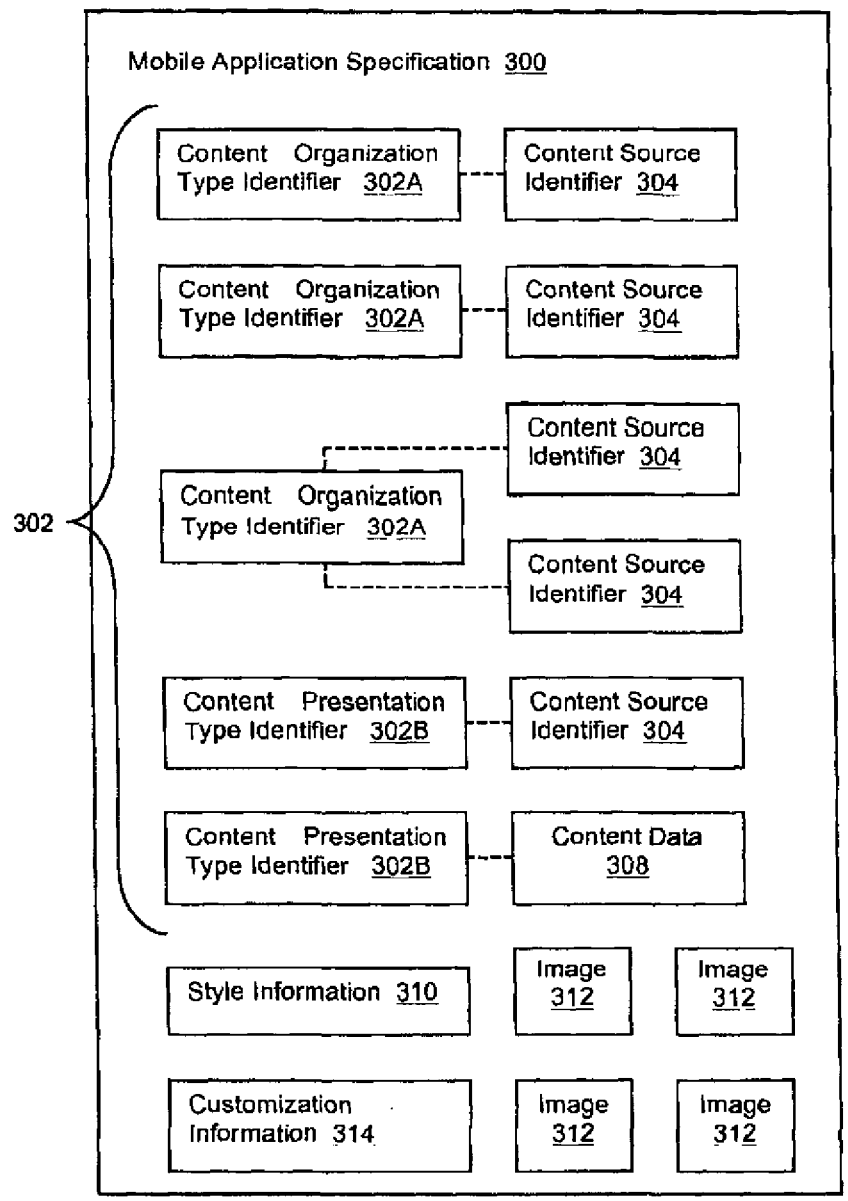

The computer 906 may contain one or more processors or microprocessors, such as a central processing unit (CPU) 910. The CPU 910 performs arithmetic calculations and control functions to execute software stored in an internal memory 912, preferably random access memory (RAM) and/or read only memory (ROM), and possibly additional memory 914. The additional memory 914 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 914 may be physically internal to the computer 906, or external as shown in FIG. 9.

The computer system 900 may also include other similar means for allowing computer programs or other instructions to be loaded. Such means can include, for example, a communications interface 916 which allows software and data to be transferred between the computer system 900 and external systems and networks. Examples of communications interface 916 can include a modem, a network interface such as an Ethernet card, a wireless communication interface, or a serial or parallel communications port. Software and data transferred via communications interface 916 are in the form of signals which can be electronic, acoustic, electromagnetic, optical or other signals capable of being received by communications interface 916. Multiple interfaces, of course, can be provided on a single computer system 900.

Input and output to and from the computer 906 is administered by the input/output (I/O) interface 918. This I/O interface 918 administers control of the display 902, keyboard 904A, external devices 908 and other such components of the computer system 900. The computer 906 also includes a graphical processing unit (GPU) 9020. The latter may also be used for computational purposes as an adjunct to, or instead of, the (CPU) 910, for mathematical calculations.

The various components of the computer system 900 are coupled to one another either directly or by coupling to suitable buses.

The methods described herein may be provided as computer program products comprising a computer readable storage medium, such as non-volatile memory having computer readable program code embodied therewith for executing the method.

The above systems and methods may be implemented entirely in software, or by way of a combination of hardware and software. In a preferred embodiment, implementation is by way of software, which includes but is not limited to firmware, resident software, microcode, and the like. Furthermore, the above systems and methods may be implemented in the form of a computer program product accessible from a computer usable or computer readable medium providing program code for use by or in connection with a computer or any instruction execution system. In such embodiments, the computer program product may reside on a computer usable or computer readable medium in a computer such as the memory 1012 of the computer 1006, or on a computer usable or computer readable medium external to the computer 1006, or on any combination thereof.

Reference has been made herein to Joomla, WordPress, Twitter, Identi.ca, Facebook, Flickr, Picasa, Foursquare, YouTube, Vimeo, Wufoo and Google Calendar.

Joomla is an open source CMS that can be used to publish content to the Web. Details of Joomla are available at http://www.joomla.org. WordPress is an open source CMS and blogging tool, details of which can be found at http://wordpress.org.

Twitter is an online social networking service through which users can post text-based messages or "tweets" consisting of up to 140 characters. More information about Twitter is available at the official web site, whose URL is http://twitter.com. The open source social networking service "identi.ca", based on the StatusNet software tool, is similar to Twitter in that users can send text updates, or "notices", of up to 140 characters in length, and provides some features presently not available in Twitter. The URL for the official identi.ca web site is http://identi.ca. Because of the short message length, Twitter and identi.ca are also known as "micro-blogging" services.

Facebook is a social networking service that allows users to, among other things, post status updates to a personal web page or "wall", publicize events and post photos. The URL for the official web site for Facebook is www.facebook.com.

Picasa and Flickr, as those terms are used herein, refer to the web sites hosted at the URLs www.picasa.google.com and www.flickr.com, respectively which are web sites that allow users to post images for viewing by others.

Foursquare is a location-based social networking service for smartphones and other networked mobile wireless telecommunication computing device, which enables users to "check in" at locations that are nearby, as determined by the locating system on the networked mobile wireless telecommunication computing device (e.g. GPS receiver hardware 822 on the smartphone 800 in FIG. 8). Among other features, Foursquare allows users to upload photos. The URL for the official website for Foursquare is https://foursquare.com.

YouTube and Vimeo are web sites that allow users to upload and view videos. The URL for the YouTube web site is http://www.youtube.com and the URL for the Vimeo web site is http://vimeo.com.

"Wufoo" refers to a specific Web application used to build online forms, which is offered by Infinity Box Inc., having an address at 12157 W. Linebaugh Ave., PMB 327 Tampa, Fla. 33626, USA. The URL for the Wufoo web site is http://wufoo.com.

Google Calendar is a calendar/time-management web application offered by Google Inc., having an address at 1600 Amphitheatre Parkway, Mountain View, Calif. 94043. The URL for the Google Calendar web site is https://www.google.com/calendar.

One or more currently preferred embodiments have been described by way of example. It will be apparent to persons skilled in the art that a number of variations and modifications can be made without departing from the scope of the claims.

What is claimed is:

1. A computer-implemented method for generating a browser-executable software program to present a web page as a mobile application, comprising:
   receiving a mobile application specification for a mobile application, and
   automatically generating a browser-executable software program based on the mobile application specification;
   the browser-executable software program including a mobile application interface façade for presentation as a user interface to the browser-executable software program;
   wherein:
   the mobile application specification comprises:
      at least one content component type identifier; and
      at least one content source identifier, each content source identifier being associated with one of the at least one content component type identifier;
   and wherein automatically generating the browser-executable software program based on the mobile application specification comprises:
      for each content component type identifier, retrieving a code generation template copy of a corresponding code generation template from a library of predefined code generation templates;
      for each content source identifier, determining from that content source identifier a URL for the content source identified by that content source identifier;
      for each content source identifier, inserting the determined URL into the code generation template copy for the content component type identifier with which that content source identifier is associated to create a populated code generation template copy; and
      executing, on a first computer system, each populated code generation template copy to generate, from each populated code generation template copy, corresponding browser-executable program code for execution on a second computer system that is distinct from the first computer system.

2. The method of claim 1, wherein automatically generating the browser-executable software program based on the mobile application specification further comprises embedding the browser-executable program code into a populated copy of a navigation container code template.

3. The method of claim 1, wherein the browser-executable program code is browser-executable scripting code.

4. The method of claim 1, wherein each content component type identifier is one of a content organization type identifier and a content presentation type identifier.

5. The method of claim 4, wherein each code generation template corresponding to a content organization type identifier comprises:
   a communication portion for generating browser-executable program code for transmitting content requests and receiving content in response thereto;
   a storage portion for generating browser-executable program code for storing the content received in response to a content request;
   a controller portion for generating browser-executable program code for receiving user input and determining a view according to the user input; and
   a presentation portion for generating browser-executable program code for presenting the content within the mobile application interface façade.

6. The method of claim 5, wherein inserting the determined URL into the code generation template copy comprises inserting the determined URL into a communication portion copy of the code generation template copy.

7. The method of claim 1, further comprising:
   storing the browser-executable software program;
   receiving, from a remote mobile wireless telecommunication computing device, a request designating the browser-executable software program; and
   responsive to the request, transmitting the browser-executable software program to the networked mobile wireless telecommunication computing device.

8. A computer program product comprising a non-transitory computer usable medium embodying computer usable program code for generating a browser-executable software program to present a web page as a mobile application, the computer program product comprising:
   computer usable program code for receiving a mobile application specification for a mobile application; and
   computer usable program code for automatically generating a browser-executable software program based on the mobile application specification;
   the browser-executable software program including a mobile application interface façade for presentation as a user interface to the browser-executable software program;
   wherein:
   the mobile application specification comprises:
      at least one content component type identifier; and
      at least one content source identifier, each content source identifier being associated with one of the at least one content component type identifier;
   and wherein the computer usable program code for automatically generating the browser-executable software program based on the mobile application specification comprises:

computer usable program code for, for each content component type identifier, retrieving a code generation template copy of a corresponding code generation template from a library of predefined code generation templates;

computer usable program code for, for each content source identifier, determining from that content source identifier a URL for the content source identified by that content source identifier;

computer usable program code for, for each content source identifier, inserting the determined URL into the code generation template copy for the content component type identifier with which that content source identifier is associated to create a populated code generation template copy; and computer usable program code for executing, on a first computer system, each populated code generation template copy to generate, from each populated code generation template copy, corresponding browser-executable program code for execution on a second computer system that is distinct from the first computer system.

9. The computer program product of claim 8, wherein the computer usable program code for automatically generating the browser-executable software program based on the mobile application specification further comprises computer usable program code for embedding the browser-executable program code into a populated copy of a navigation container code template.

10. The computer program product of claim 8, wherein the browser-executable program code is browser-executable scripting code.

11. The computer program product of claim 8, wherein each content component type identifier is one of a content organization type identifier and a content presentation type identifier.

12. The computer program product of claim 11, wherein each code generation template corresponding to a content organization type identifier comprises:

a communication portion for generating browser-executable program code for transmitting content requests and receiving content in response thereto;

a storage portion for generating browser-executable program code for storing the content received in response to a content request;

a controller portion for generating browser-executable program code for receiving user input and determining a view according to the user input; and a presentation portion for generating browser-executable program code for presenting the content within the mobile application interface façade.

13. The computer program product of claim 12, wherein inserting the determined URL into the code generation template copy comprises inserting the determined URL into a communication portion copy of the code generation template copy.

14. The computer program product of claim 8, further comprising:

computer usable program code for storing the browser-executable software program;

computer usable program code for receiving, from a remote mobile wireless telecommunication computing device, a request designating the browser-executable software program; and computer usable program code for, responsive to the request, transmitting the browser-executable software program to the networked mobile wireless telecommunication computing device.

15. A first computer system for generating a browser-executable software program to present a web page as a mobile application, comprising:

a memory for storing instructions;

at least one processing unit coupled to the memory for executing the instructions stored in the memory, wherein the instructions, when executed by the at least one processing unit, cause the computer system to:

receive a mobile application specification for a mobile application; and automatically generate a browser-executable software program based on the mobile application specification;

the browser-executable software program including a mobile application interface façade for presentation as a user interface to the browser-executable software program wherein:

the mobile application specification comprises:

at least one content component type identifier; and at least one content source identifier, each content source identifier being associated with one of the at least one content component type identifier;

and wherein the instructions, when executed by the at least one processing unit, cause the computer system to automatically generate the browser-executable software program based on the mobile application specification by:

for each content component type identifier, retrieving a code generation template copy of a corresponding code generation template from a library of predefined code generation templates;

for each content source identifier, determining from that content source identifier a URL for the content source identified by that content source identifier;

for each content source identifier, inserting the determined URL into the code generation template copy for the content component type identifier with which that content source identifier is associated to create a populated code generation template copy; and executing, on the first computer system, each populated code generation template copy to generate, from each populated code generation template copy, corresponding browser-executable program code for execution on a second computer system that is distinct from the first computer system.

16. The computer system of claim 15, wherein the instructions, when executed by the at least one processing unit, cause the computer system to automatically generate the browser-executable software program based on the mobile application specification by embedding the browser-executable program code into a populated copy of a navigation container code template.

17. The computer system of claim 15, wherein the browser-executable program code is browser-executable scripting code.

18. The computer system of claim 15, wherein each content component type identifier is one of a content organization type identifier and a content presentation type identifier.

19. The computer system of claim 18, wherein each code generation template corresponding to a content organization type identifier comprises:

a communication portion for generating browser-executable program code for transmitting content requests and receiving content in response thereto;

a storage portion for generating browser-executable program code for storing the content received in response to a content request;

a controller portion for generating browser-executable program code for receiving user input and determining a view according to the user input; and a presentation portion for generating browser-executable program code for presenting the content within the mobile application interface façade.

20. The computer system of claim 19, wherein inserting the determined URL into the code generation template copy comprises inserting the determined URL into a communication portion copy of the code generation template copy.

21. The computer system of claim 15, wherein the instructions, when executed by the at least one processing unit, further cause the computer system to:

store the browser-executable software program;

receive, from a remote mobile wireless telecommunication computing device, a request designating the browser-executable software program; and responsive to the request, transmit the browser-executable software program to the networked mobile wireless telecommunication computing device.

\* \* \* \* \*

UNITED STATES PATENT AND TRADEMARK OFFICE
CERTIFICATE OF CORRECTION

| | | |
|---|---|---|
| PATENT NO. | : 8,615,712 B2 | Page 1 of 1 |
| APPLICATION NO. | : 13/407745 | |
| DATED | : December 24, 2013 | |
| INVENTOR(S) | : Robert Gerald Porter et al. | |

It is certified that error appears in the above-identified patent and that said Letters Patent is hereby corrected as shown below:

In the Drawings,

Sheet 5, Fig. 5, the text "Mobile Application Specification" should read "Code Generation Template".

Signed and Sealed this
Ninth Day of December, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,615,712 B2  
APPLICATION NO. : 13/407745  
DATED : December 24, 2013  
INVENTOR(S) : Porter et al.

Page 1 of 2

It is certified that error appears in the above-identified patent and that said Letters Patent is hereby corrected as shown below:

In the Drawings:

Delete drawing sheet 3, and replace with new drawing sheet 3. (attached)

Specification:

Column 5, lines 47-64, should read:

The mobile application specification 300 further comprises one or more content source identifiers 304, with each content source identifier 304 associated with one of the content component type identifiers 302. As will be explained further below, each content organization type identifier 302A has at least one content source identifier 304 associated therewith, and each content presentation type identifier 302B has either a content source identifier 304 or content data 308 associated therewith. Each content source identifier 304 will identify a content source, e.g. a location on the Web, from which can be retrieved content according to the content component type identified by the associated content component type identifier 302. In the simplest case, the content source identifier 304 may be a uniform resource locator (URL); the content source identifier 304 may however be any suitable identifier that enables a URL for the relevant content source to be determined. For example, the content source identifier 304 may be a Twitter handle or a Facebook name.

Column 5, lines 65-67 and column 6, lines 1-5, should read:

The mobile application specification 300 may further comprise style information 310 specifying aspects of the desired appearance of the web page that will be presented as a mobile application along with one or more images 312 that may be included, for example as a splash screen or as an icon. The style information 310 and images 312 are optional, as the web page that will be presented as a mobile application may use a default style and default images.

Signed and Sealed this  
Fifth Day of April, 2016

Michelle K. Lee  
*Director of the United States Patent and Trademark Office*